United States Patent [19]

Planeta

[11] 4,373,979
[45] Feb. 15, 1983

[54] SEALED BAGS OF PLASTIC MATERIALS

[75] Inventor: Mirek Planeta, Burlington, Canada

[73] Assignee: Workman Bag Company Ltd., Montreal, Canada

[21] Appl. No.: 191,119

[22] Filed: Sep. 26, 1980

[51] Int. Cl.³ .................. B29D 23/10; B32B 31/20
[52] U.S. Cl. .................. 156/73.1; 156/73.4; 156/217; 156/227; 156/290; 156/308.4
[58] Field of Search .................. 156/73.1, 73.4, 157, 156/290, 308.4, 580.1, 580.2, 217, 227

[56] References Cited

U.S. PATENT DOCUMENTS

| | | | |
|---|---|---|---|
| 2,495,761 | 1/1950 | Platt | 156/157 |
| 3,331,719 | 7/1967 | Soloff | 156/73.4 |
| 3,535,184 | 10/1970 | Schwartz | 156/157 |
| 4,070,513 | 1/1978 | Rhoads | 156/290 |
| 4,090,897 | 5/1978 | Minick | 156/73.1 |

FOREIGN PATENT DOCUMENTS 55-9832  1/1980  Japan .................. 156/73.4

*Primary Examiner*—Michael G. Wityshyn
*Attorney, Agent, or Firm*—Hirons, Rogers & Scott

[57] ABSTRACT

A method of sealing a sheet of woven ribbons of heat sealable plastics material to an article which may be another sheet of said plastics material comprises applying a regular pattern of ultrasonic spot welds between said sheet and said other article. The pattern of ultrasonic spot welds comprises at least two rows of welds offset with respect to one another so that the welds fall on different parallel ribbons of the sheet and in one preferred embodiment welds or adjacent rows are sequentially staggered by the breadth of one ribbon so that welds of each row form repeating diagonal lines, the diagonal lines extending between the top and the bottom row. The method is especially suitable for use with woven oriented plastics material. The invention includes a bag at least one of whose seams is formed by this ultrasonic spot welding method. A particular bag is a gussetted bag in which seams along at least the bottom edges of the gussets are formed by the ultrasonic spot welding technique.

4 Claims, 6 Drawing Figures

SEALED BAGS OF PLASTIC MATERIALS

FIELD OF THE INVENTION

This invention is concerned with improvements in or relating to methods of sealing members of plastics material one to another and to plastics material bags having seams formed by said method.

REVIEW OF THE PRIOR ART

Sealed bags of plastic material are used extensively in industry for the packing of bulk goods, and the uses to which they are put are constantly expanding. One especially useful material for, inter alia, bag manufacture is, for example, that sold under the trade mark "Fabrene" by DuPont. This material consists of thin warp and weft strips of highly longitudinally-oriented, high-density polyethylene or polypropylene, the strips being woven together so as to provide a sheet material of very high strength in the two directions at right angles along the lengths of the strips; the woven material usually has a thin continuous layer of plastic material applied over one entire face.

The joining of this type of plastic material has been difficult and expensive hitherto, since any attempt to use conventional heat-sealing methods of joining two sheets together results in loss of the orientation and consequent weakening of the material, precisely at the location where maximum strength is required. One solution has been to sew the seams, but this is a relatively slow and expensive procedure, and the sewn seams are usually the weakest part of the resultant bag. It has also been proposed to form seals using hot melt adhesive but this is not always a suitable method. For example, if such adhesive is used in the production of gussetted bags using automatic machinery, an extra step is needed to seal the necessary gusset-forming pleat. Moreover, again care is taken the strength of the seal will be low as compared with the strength of the plastic material.

DEFINITION OF THE INVENTION

It is therefore an object of the invention to provide a method for sealing woven sheet plastics material to a further plastics material member.

It is a more specific object to provide a new sealed bag construction that is especially suitable for manufacture by a continuous process on automatic machines.

It is a still more specific object to provide a new sealed bag construction.

In accordance with the present invention there is provided a method of sealing together a first member and a second member of plastics material, at least one of which members is a fabric comprising a first plurality of parallel strips interwoven with a second plurality of parallel strips at right angles to the said first plurality, the strips of each plurality being of the same width and being of oriented plastics material whose orientation and strength are adversely affected by heat, said method comprising the steps of:

overlapping respective portions of said first member and said second member at the location of the joint to be formed between them, applying to the said overlapping portions at least two parallel rows of ultrasonic spot welds in a specific pattern wherein the rows of spot welds are parallel to the first plurality of parallel strips, the rows are spaced apart from one another a distance corresponding to the width of the strips of the first plurality, or a multiple thereof, the spot welds of each row are spaced apart a distance corresponding to the width of the strips of the second plurality times the number of rows, or a multiple thereof, and the immediately adjacent spot welds of the two rows are staggered relative to one another along the length of the respective rows whereby the said immediately adjacent spot welds are on different strips of the second plurality.

Also in accordance with the present invention there is provided a method for forming an end seal in a bag of plastics material formed from a sheet of a fabric comprising a first plurality of parallel strips interwoven with a second plurality of parallel strips at right angles to the said first plurality, the strips of each plurality being of the same width and being of oriented plastics material whose orientation and strength are adversely affected by heat, said method comprising the steps of:

folding the sheet so that portions thereof overlap and sealing the overlapping portions together to form an open-ended tube, applying to the portion of the tube at the said open end applying to the portion of the tube at the said open end at least two parallel rows of ultrasonic spot welds in a specific pattern wherein the rows of spot welds are parallel to the first plurality of parallel strips, the rows are spaced apart from one another a distance corresponding to the width of the strips of the first plurality, or a multiple thereof, the spot welds of each row are spaced apart a distance corresponding to the width of the strips of the second plurality times the number of rows, or a multiple thereof, and the immediately adjacent spot welds of the two rows are staggered relative to one another along the length of the respective rows whereby the said immediately adjacent spot welds are on different strips of the second plurality.

DESCRIPTION OF THE DRAWINGS

A preferred method of forming a seal and a bag formed by the method will now be described with reference to the accompanying diagrammatic drawings wherein.

DESCRIPTION OF THE PREFERRED EMBODIMENT

Figure 1:
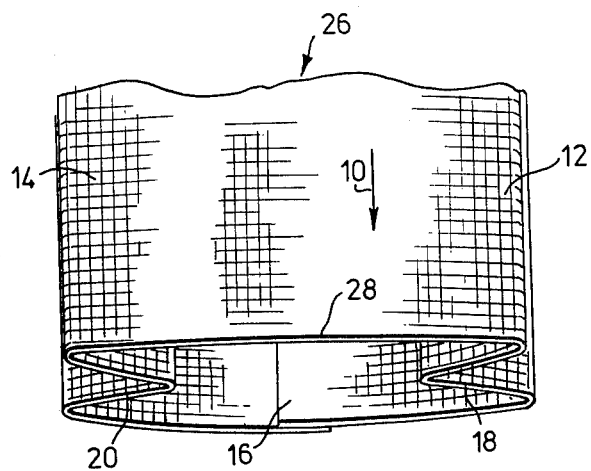
FIG. 1 is a perspective view of an open end of a seamed tube of oriented plastics material from which the bottom of a bag will be formed by sealing by the method of the invention.
Figure 2:
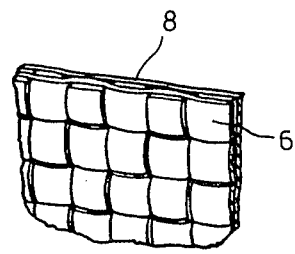
FIG. 2 is a detail showing the weave of the material of FIG. 1.

The method of forming the seal is readily applicable to, and the bag particularly illustrated and to be described is readily formed on an automatic continuously-operated machine fed with a continuous sheet of material. The material is the "woven" type of plastic material, such as that sold under the trade mark "Fabrene" of DuPont. As described above, and as illustrated by FIG.

2, this material is woven from narrow ribbons 6 of highly longitudinally oriented plastics material, so that advantage can be taken of the extremely high strengths that are available with such oriented materials in the direction of orientation. The resulting woven layer usually is overlaid with a continuous plastic layer 8. For example, such a material that is about 0.002 inch thickness (0.05 mm) will exhibit in the direction of orientation the strength of low density polyethylene unoriented unwoven material of about 0.015 to 0.020 inch thickness (0.38–0.5 mm). The material has however the disadvantages that it is not possible to employ conventional heat-sealing steps to join sheets thereof together, since the required temperature for sealing results in loss of orientation and strength just where maximum strength is most desirable.

In the manufacture of a bag of the invention a strip of this material is moved lengthwise in the direction of the arrow 10 in FIG. 1, and continuously has its two parallel side edge portions 12 and 14 folded toward one another to overlap at an overlap junction 16, while at the same time two edge pleats 18 and 20 are formed therein to provide respective gussets in the finished bag. Again at the same time a layer of a suitable hot melt adhesive, e.g. one melting in the range 300°–400° F. (150°–200° C.), is, in this embodiment, applied between the overlapping edge parts which are then pressed together while the melt cools and seals them together. Since the bag material can act as a heat sink this is a very rapid operation, much faster than could be achieved with an evaporative type adhesive where the bag material is not porous to the evaporating solvent. A tape 17 may be adhered over the outer overlapping edge by means of a hot melt adhesive.

As the end 28 of the resulting flattened two-layer tube 26 advances in the direction of arrow 10, at least three rows of staggered ultrasonic spot welds 24 are applied, at least in the region of the pleats 18, 20 at the end margin of the tube.

Figure 4:
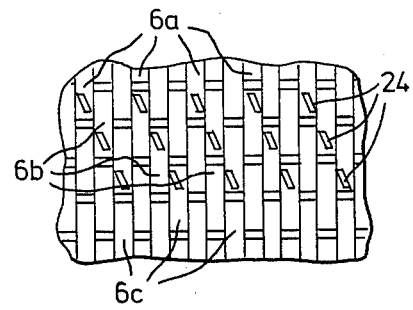
FIG. 4 is a detail showing one embodiment of the pattern of ultrasonic spot welds that is employed.

Each row of spot welds 24 is offset along its length in relation to the adjacent row and in this embodiment each row is offset in this manner in respect of both the others. The welds are thereby arranged in a regular pattern intended to ensure that each weld is located on a different parallel ribbon 6. For strength it is preferable that only one weld is located on one ribbon and that any weld is located centrally on its respective ribbon so that there is no interference with the continuity of the orientation of the plastics material along the edges of the ribbon. Thus, one convenient pattern of spot welds is that shown in FIG. 4 comprising three rows 24 of spot welds. In the pattern of FIG. 4, since it consists of three parallel rows, in each row 24 the welds are so spaced so that they are located in the centre of every third parallel ribbon 6a. Adjacent rows 24 are sequentially offset or staggered with respect to one another along their lengths by the breadth of a ribbon so that the welds of the middle row 24 are located in the centre of every third parallel ribbon 6b and the welds of the third row 24 are located in the centre of every third parallel ribbon 6c. Each row is spaced one from another by the breadth of the parallel ribbons 6 running at right angles to the sets of parallel ribbons 6a, 6b, 6c. Thus diagonal sets of three spot welds are provided. The layers of tube 26 are preferably positioned for welding so that ribbons of both layers register with one another. When this is so each spot weld will be located in the centre of registering ribbons of both layers causing minimum interference with the orientation along the edges of either ribbon.

It may in some circumstances be convenient to seal side edge portions 12 and 14 by ultrasonic spot welding in a similar manner instead of by using hot melt adhesive.

Figure 6:
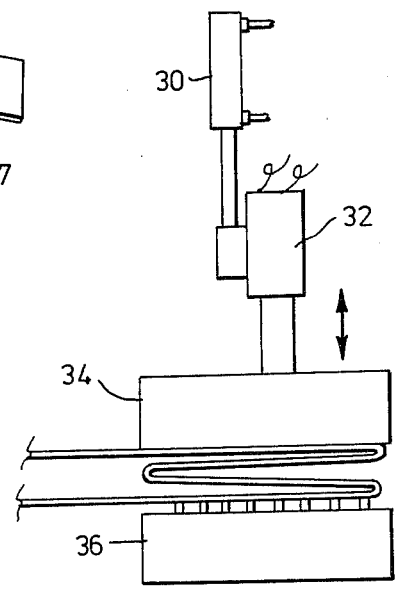
FIG. 6 is a diagrammatic sketch showing one embodiment and apparatus for carrying out this preferred method.

The spot welds are conveniently applied by means of the apparatus units shown schematically in FIG. 6. One such unit is located above the path of travel of each gusset forming pleat 18, 20. Each apparatus unit comprises a press 30, a transducer 32, a horn 34 and an anvil 36. The unit operates automatically such that when a bag length of tube 26 has travelled in the direction of arrow 10 the press 30 descends, the transducer 32 actuates horn 34 and ultrasonic spot welds are produced in regular pattern dictated by anvil 36.

It can also be clearly appreciated that while the embodiment described concerns two apparatus units intended to stamp two patterns of ultrasonic spot welds in the gusset regions of the end of the tube 28 to fasten together the tube layers through the gussets 18, 20 any suitable width, pattern and number of units may be used adapted for continuous or intermittent automatic or manual operation.

At, just before, or just after the welding step the tube is cut to produce free end 28. This end 28, when it has been provided with rows 24 of spot welds, is folded over to overlie the remainder of the tube and thereby close the part of the tube end that is not closed by the rows of welds, which in this embodiment are only in regions of gussets 18, 20. In alternative cases where the rows of welds extend the whole width of the tube end this folding over step is not necessary to close the tube end but at least produces a tidy seal.

Figure 3:
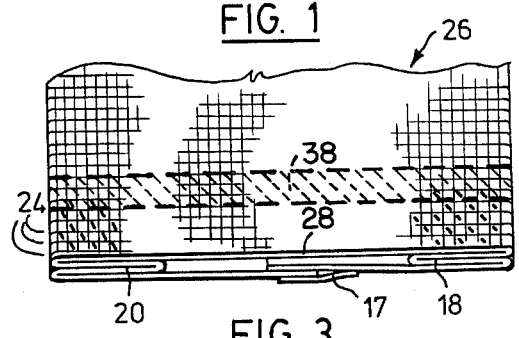
FIG. 3 is a similar perspective view of the tube of FIG. 1 showing a later stage of formation of the bag.
Figure 5:
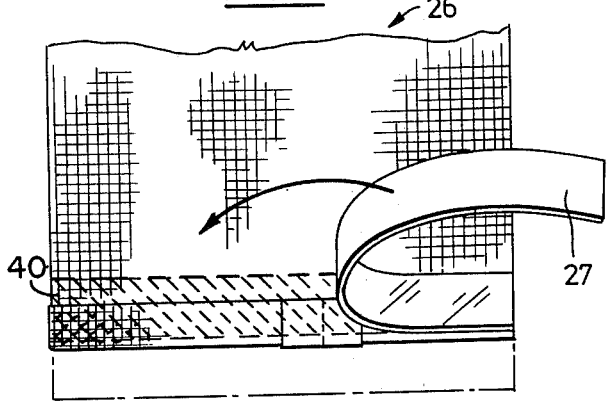
FIG. 5 is a similar perspective view of the tube of FIG. 1 showing the now folded, sealed end of the bag.

As this folding takes place a layer 38 of hot melt adhesive (FIG. 3) is interposed between the abutting surfaces and fastens them together. Another layer 40 (FIG. 5) of hot melt adhesive is applied over the adjoining upward-facing surfaces and a piece 27 of tape material, of at least the full width of the tube, is applied over the layer to be sealed to the surfaces and complete the closing of the bag end.

At least where the ultrasonic welds are applied it is advantageous to locate the layers so that parallel ribbons of one layer accurately overlie parallel ribbons of the other layer so that the ultrasonic spot welds can be centred through two ribbons.

We claim:

1. A method of sealing together a first member and a second member of plastics material, at least one of which members is a fabric comprising a first plurality of parallel strips interwoven with a second plurality of parallel strips at right angles to the said first plurality, the strips of each plurality being of the same width and being of oriented plastics material whose orientation and strength are adversely affected by heat, said method comprising the steps of:

overlapping respective portions of said first member and said second member at the location of the joint to be formed between them, applying to said overlapping portions at least two parallel rows of ultrasonic spot welds in a specific pattern wherein the rows of spot welds are parallel to the first plurality of parallel strips, the rows are spaced apart from one another a distance corresponding to the width of the strips of the first plurality, or a multiple thereof, the spot welds of each row are spaced apart a distance corresponding to the width of the strips of the second plurality times the number of rows, or a multiple thereof, and the immediately adjacent spot welds of the two rows are staggered relative to one another along the length of the respective rows whereby the said immediately adjacent spot welds are on different strips of the second plurality.

2. A method as claimed in claim 1, wherein both of the said first and second members are of said fabric and the strips of the first member are in register with the strips of the second member during the sealing by the said ultrasonic spot welds.

3. A method of forming an end seal in a bag of plastics material formed from a sheet of a fabric comprising a first plurality of parallel strips interwoven with a second plurality of parallel strips at right angles to the said first plurality, the strips of each plurality being of the same width and being of oriented plastics material whose orientation and strength are adversely affected by heat, said method comprising the steps of:

folding the sheet so that portions thereof overlap and sealing the overlapping portions together to form an open-ended tube, applying to the portion of the tube at the said open end at least two parallel rows of ultrasonic spot welds in a specific pattern wherein the rows of spot welds are parallel to the first plurality of parallel strips, the rows are spaced apart from one another a distance corresponding to the width of the strips of the first plurality, or a multiple thereof, the spot welds of each row are spaced apart a distance corresponding to the width of the strips of the second plurality times the number of rows, or a multiple thereof, and the immediately adjacent spot welds of the two rows are staggered relative to one another along the length of the respective rows whereby the said immediately adjacent spot welds are on different strips of the second plurality.

4. A method as claimed in claim 3, and including the further step of folding the tube end portion to overlay the body of the tube and so that the portion thereof having the spot welds is overlaid by another tube portion, and applying a length of sealing tape over the junction between the tube end and the body of the tube to seal the tube end closed.

* * * * *